(12) United States Patent  
Nakagawa et al.

(10) Patent No.: US 8,405,544 B2
(45) Date of Patent: Mar. 26, 2013

(54) METHOD AND DEVICE FOR PROCESSING SIGNAL, RADAR APPARATUS, AND PROGRAM FOR PROCESSING SIGNAL

(75) Inventors: Kazuya Nakagawa, Nishinomiya (JP); Hitoshi Maeno, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 229 days.

(21) Appl. No.: 13/082,164

(22) Filed: Apr. 7, 2011

(65) Prior Publication Data

US 2011/0298651 A1 Dec. 8, 2011

(30) Foreign Application Priority Data

Jun. 3, 2010 (JP) ................................ 2010-127708

(51) Int. Cl.
*G01S 13/42* (2006.01)
(52) U.S. Cl. ......................................... 342/146; 342/159
(58) Field of Classification Search .............. 342/90–91, 342/133, 139–140, 146, 159, 162
See application file for complete search history.

(56) References Cited

U.S. PATENT DOCUMENTS

| | | | | |
|---|---|---|---|---|
| 4,489,320 A | * | 12/1984 | Lewis et al. | 342/94 |
| 5,652,594 A | * | 7/1997 | Costas | 342/162 |
| 7,489,267 B2 | * | 2/2009 | Kojima et al. | 342/185 |
| 2008/0030401 A1 | * | 2/2008 | Kojima et al. | 342/185 |
| 2011/0298651 A1 | * | 12/2011 | Nakagawa et al. | 342/146 |
| 2012/0007767 A1 | * | 1/2012 | Maeno | 342/92 |
| 2012/0127018 A1 | * | 5/2012 | Nakagawa | 342/90 |
| 2012/0127023 A1 | * | 5/2012 | Nakagawa et al. | 342/146 |

FOREIGN PATENT DOCUMENTS

| | | |
|---|---|---|
| JP | 5-27011 A | 2/1993 |
| JP | 2010203941 A * | 9/2010 |

* cited by examiner

*Primary Examiner* — John B Sotomayor
(74) *Attorney, Agent, or Firm* — Birch, Stewart, Kolasch & Birch, LLP

(57) ABSTRACT

This disclosure provides a signal processing device, which includes an echo signal input module for being inputted with echo signals caused by electromagnetic waves emitted from an antenna being reflected on one of more target objects, an echo signal level detecting module for detecting a level of each of the echo signals in association with a distance and an azimuth direction from the antenna, a level change detecting module for detecting a level change between the echo signals from locations which are close to each other where the distances from the antenna are substantially the same but the azimuth directions from the antenna are different, a pattern output module for comparing the level change with a pattern determined in advance to output a level change pattern, and an interference determining module for determining interference based on at least two of the level change patterns.

20 Claims, 12 Drawing Sheets

ECHO IMAGE BEFORE INTERFERENCE REJECTION

CONVENTIONAL INTERFERENCE REJECTION

INTERFERENCE REJECTION OF THIS EMBODIMENT

ECHO IMAGE BEFORE
INTERFERENCE
REJECTION
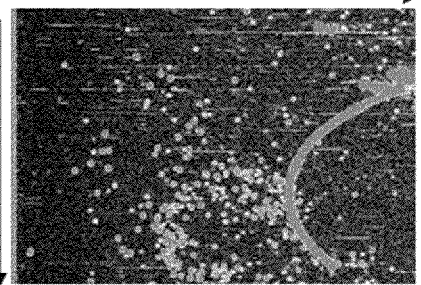
FIG. 11A
CONVENTIONAL
INTERFERENCE REJECTION
INTERFERENCE REJECTION
OF THIS EMBODIMENT
(ONE SAMPLE
IN DISTANCE DIRECTION)
INTERFERENCE REJECTION
OF THIS EMBODIMENT
(FOUR SAMPLES IN
DISTANCE DIRECTION)

METHOD AND DEVICE FOR PROCESSING SIGNAL, RADAR APPARATUS, AND PROGRAM FOR PROCESSING SIGNAL

CROSS-REFERENCE TO RELATED APPLICATION(S)

The application claims priority under 35 U.S.C §119 to Japanese Patent Application No. 2010-127708, which was filed on Jun. 3, 2010, the entire disclosure of which is hereby incorporated by reference.

TECHNICAL FIELD

The present invention relates to a signal processing device that carries out various kinds of processing to echo signals.

BACKGROUND

Conventionally, in radar apparatuses, there has been a problem in which, a display quality of a radar image may be degraded when electromagnetic waves (interference component) transmitted from other ships are contained in an echo signal.

Thus, another radar apparatus is proposed, which determines as interference when only a signal corresponding to one sweep before the current sweep among three or more consecutive signals of the same azimuth and distance exceeds a threshold, and removes the interference by not displaying the signal (zero substitution) (see JP H05-027011(A)).

However, low level interferences may occur in fact, and if raising the threshold and weakening the interference removing processing, there has been a problem in which the interferences cannot be removed sufficiently. On the other hand, if lowering the threshold, the echo signals from target objects which are necessary may be removed.

SUMMARY

Therefore, the present invention is made in view of the situations as described above and, thus, provides a signal processing device that can accurately remove an interference component while reducing suppression of the echoes other than interference.

According to an aspect of the invention, a signal processing device is provided, which includes an echo signal input module for being inputted with echo signals caused by electromagnetic waves emitted from an antenna being reflected on one or more target objects, an echo signal level detecting module for detecting a level of each of the echo signals in association with a distance and an azimuth direction from the antenna, a level change detecting module for detecting a level change between the echo signals from locations which are close to each other where the distances from the antenna are substantially the same but the azimuth directions from the antenna are different, a pattern output module for comparing the level change with a reference pattern determined in advance to output a level change pattern, and an interference determining module for determining interference based on at least two of the level change patterns.

Thereby, the level change pattern peculiar to an interference component in which its level dramatically falls after dramatically arising in the azimuth direction can be extracted. In this case, only the interference component can be extracted further accurately compared to the conventional case of a determination based on whether a signal exceeds a threshold from another signal at a position along the time axis.

The locations corresponding to the echo signals used for outputting the at least two level change patterns may be adjacent to each other.

The pattern output module may classify the pattern into one of a first pattern in which the level change exceeds a first threshold, a second pattern in which the level change is less than a second threshold, and a third pattern in which the level change neither apply to the first pattern nor the second pattern.

The interference determining module may determine as the interference when the pattern of the level change changes from the first pattern to the second pattern.

The interference determining module may determine as the interference when the pattern of the level change changes from the first pattern to the third pattern.

The interference determining module may determine as is the interference when the pattern of the level change changes from the third pattern to the second pattern.

The level change may correspond to a difference value of the levels of the echo signals adjacent to each other in the azimuth direction.

The interference determining module may determine as the interference in either one of cases where the third pattern following after the first pattern exists and where at least two of the third patterns continuously exist.

The interference determining module may determine as the interference in either one of cases where at least two of the third patterns continuously exist and where the second pattern following after the third pattern exists.

The interference determining module may determine as the interference in a case where at least two of the first patterns continuously exist.

The interference determining module may determine as the interference in a case where at least two of the second patterns continuously exist.

The level change detecting module may average the respective level changes in the distance direction. The pattern output module may compare the averaged level change with the level change pattern.

The level change detecting module may further detect a level change between the echo signals from locations which are close to each other where the azimuth directions from the antenna are substantially the same but the distances from the antenna are different. The pattern output module outputs the most frequent change pattern among the level change patterns within a predetermined distance range, as the change pattern for the azimuth and distance directions.

The level change detecting module may further detect a level change between the echo signals from locations which are close to each other where the azimuth directions from the antenna are substantially the same but the distances from the antenna are different. The interference determining module may determine the interference further based on a plurality of level change patterns close to each other in the distance direction.

The signal processing device may further include an echo signal level controlling module for controlling the level of the echo signal caused by the interference.

The echo signal level controlling module may replace the level of the echo signal caused by the interference by any one of the levels of the echo signals adjacent to each other in the azimuth direction.

The echo signal level controlling module may replace the level of the echo signal caused by the interference by an average value of a plurality of levels of the echo signals adjacent to each other in the azimuth direction.

The echo signal level controlling means may linearly interpolate the level of the echo signal caused by the interference according to a plurality of levels of the echo signals adjacent to each other in the azimuth direction.

According to another aspect of the invention, a radar apparatus is provided, which includes the signal processing device of any one of the other aspects, and an antenna for revolving while emitting electromagnetic waves for every azimuth direction and receiving echo signals.

According to another aspect of the invention, a method of processing a signal includes inputting echo signals caused by electromagnetic waves emitted from an antenna being reflected on one or more target objects, detecting a level of each of the echo signals in association with a distance and an azimuth direction from the antenna, detecting a level change between the echo signals from locations which are close to each other where the distances from the antenna are substantially the same but the azimuth directions from the antenna are different, comparing the level change with a reference pattern determined in advance to output a level change pattern, and determining interference based on at least two of the level change patterns.

According to another aspect of the invention, a computer readable program for causing a computer to process a signal is provided, which includes causing a computer to be inputted with echo signals caused by electromagnetic waves emitted from an antenna being reflected on one or more target objects, causing a computer to detect a level of each of the echo signals in association with a distance and an azimuth direction from the antenna, causing a computer to detect a level change between the echo signals from locations which are close to each other where the distances from the antenna are substantially the same but the azimuth directions from the antenna are different, causing a computer to compare the level change with a reference pattern determined in advance to output a level change pattern, and causing a computer to determine interference based on at least two of the level change patterns.

According to any of the signal processing devices described above, an interference component can accurately be removed while reducing suppression of echoes other than interference.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 11A to 11D are views showing echo images; and

DETAILED DESCRIPTION

Figure 1A:
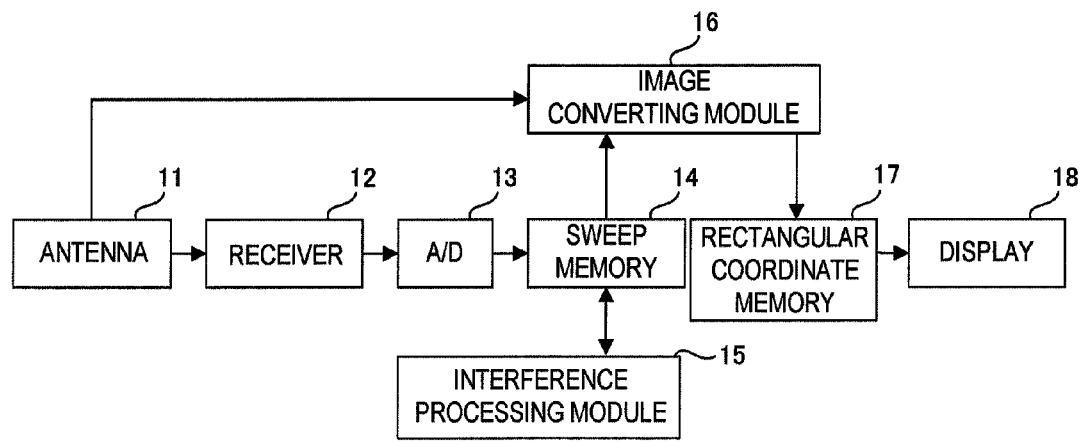
FIG. 1A is a block diagram showing a configuration of a radar apparatus according to one embodiment of the invention.

A signal processing device of one embodiment includes an echo signal input module, an echo signal level detecting module, a level change detecting module, a pattern output module, an interference determining module. The echo signal input module is inputted with echo signals caused by electromagnetic waves emitted from an antenna being reflected on target object(s). The echo signal level detecting module detects a level of each of the echo signals in association with a distance and an azimuth directions from the antenna. The level change detecting module detects a level change (e.g., difference value) between the echo signals from locations which are close to each other where the distances from the antenna are substantially the same but the azimuth directions from the antenna are different.

Further, the pattern output module compares the level change with a reference pattern determined in advance to output a level change pattern. For example, the pattern output module classifies into one of patterns, such as, a pattern (first pattern P) where, with respect to data $x(n)$ of a certain sweep (observing sweep data), data $x(n+1)$ of the next sweep becomes larger, a pattern (second pattern N) where the data $x(n+1)$ of the next sweep becomes smaller than the data $x(n)$ of the certain sweep, and a pattern (third pattern Z) of other cases.

The interference determining module determines interference based on at least two of the level change patterns. For example, it determines as the interference when the change pattern from the observing sweep data $x(n)$ to the sweep data $x(n-1)$ of one sweep before is the pattern P and when the change pattern from the data $x(n)$ to the next sweep data $x(n+1)$ is the pattern N. Further, a plurality of interference components may continue in the azimuth direction. Therefore, it may further determine as the interference when the change pattern from the sweep data $x(n-1)$ of one sweep before to the observing sweep data $x(n)$ is the pattern P and the change pattern from the data $x(n)$ to the next sweep data $x(n+1)$ is the pattern Z, or when the change pattern from the sweep data $x(n-1)$ of one sweep before to the observing sweep data $x(n)$ is the pattern Z and the change pattern from the data $x(n)$ to the next sweep data $x(n+1)$ is the pattern N.

Further, the determination may be performed using not only the three data of the observing sweep, the sweep of one sweep before, and the next sweep, but using data of the larger number of sweeps. For example, it is determined as the interference when the change pattern from sweep data $x(n-2)$ of two sweeps before to the sweep data $x(n-1)$ of one sweep before is the pattern P, the change pattern from the sweep data $x(n-1)$ to the sweep data $x(n)$ is the pattern Z, and the change pattern from the sweep data $x(n)$ to the sweep data $x(n+1)$ is also the pattern Z. Moreover, it may also be determined as the interference when the change pattern from the sweep data $x(n-1)$ to the sweep data $x(n)$ is the pattern Z, the change pattern from the sweep data $x(n)$ to the sweep data $x(n+1)$ is the pattern Z, and the change pattern from the sweep data x(n+1) to the sweep data x(n+2) is also the pattern N. Thereby, the detection of the interference components continuing in the azimuth direction can be performed.

Further, it may be determined as the interference components when all of the patterns of a plurality of level changes continuing in the azimuth direction are the pattern P, such as, when the change pattern from the sweep data x(n−2) to the sweep data x(n−1) is the pattern P and the change pattern from the sweep data x(n−1) to the sweep data x(n) is the pattern P, or when the change pattern from the sweep data x(n−1) to the sweep data x(n) is the pattern P and the change pattern from the sweep data x(n) to the sweep data x(n+1) is the pattern P. Moreover, it may be determined as the interference components when all of the patterns of a plurality of level changes continuing in the azimuth direction are the pattern N, such as, when the change pattern from the sweep data x(n−1) to the sweep data x(n) is the pattern N and the change pattern from the sweep data x(n) to the sweep data x(n+1) is the pattern N, or when the change pattern from the sweep data x(n) to the sweep data x(n+1) is the pattern N and the change pattern from the sweep data x(n+1) to the sweep data x(n+2) is the pattern N. Thereby, the detection of the interference components having signal levels different from each other in the azimuth direction can be performed.

Further, the signal processing device may operate by taking level changes in the distance direction into consideration. For example, the level change detecting module averages the level changes in the azimuth direction using signals in the distance directions. In this case, the pattern output module compares the averaged level changes with the level change patterns. Alternatively, the level changes adjacent to each other in the distance direction are further detected, and the most frequent level change pattern within a predetermined distance range may be outputted as the level change pattern for the azimuth and distance directions.

Hereinafter, another embodiment of the invention is described in detail with reference to the accompanying drawings.

FIG. 1A is a block diagram showing a configuration of a radar apparatus installed with a signal processing device of this embodiment. The radar apparatus is equipped in, for example, a ship, transmits and receives electromagnetic waves around a ship concerned (that equips the radar apparatus in this embodiment), and detects a target object such as another ship.

The radar apparatus includes an antenna 11, a receiver 12, an A/D converter 13, a sweep memory 14, an interference processing module 15, an image converting module 16, a rectangular coordinate memory 17, and a display 18, as shown in FIG. 1A.

The antenna 11 transmits electromagnetic waves to respective azimuth directions around the ship concerned, and receives respective echo signals. The receiver 12 outputs values according to levels of the echo signals received by the antenna 11 to the A/D converter 13. The A/D converter 13 carries out digital conversion of the inputted echo signals having analog values, and outputs them to the sweep memory 14 as measurement data.

The sweep memory 14 stores the measurement data for one measurement cycle (for 360 degrees around the ship). Each measurement data is stored as sample data (sweep data) associated with azimuth direction of a polar coordinate system and distance.

The image converting module 16 is inputted with the sweep data from the sweep memory 14, converts it into data of a rectangular coordinate system which has a position of the ship at its origin, and outputs the data as a pixel intensity value of the gradation according to a level of each sweep data. The pixel intensity value of the rectangular coordinate system is stored in the rectangular coordinate memory 17 as rectangular coordinate data.

Figure 5A:
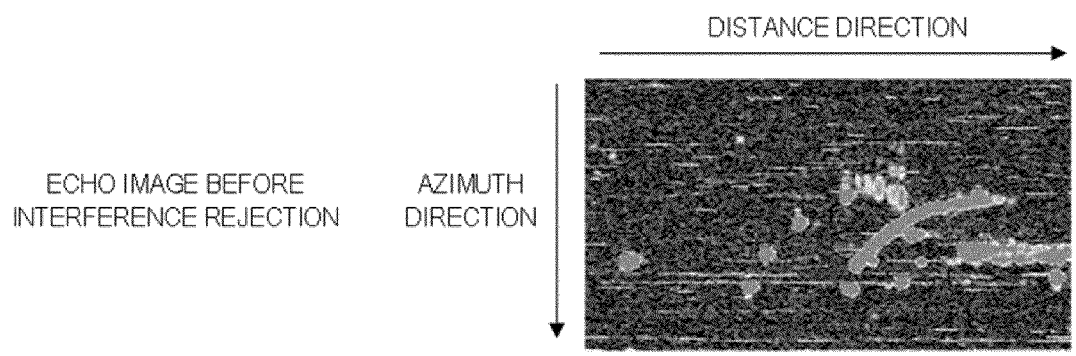
FIGS. 5A to 5C are views showing echo images.
Figure 5B:
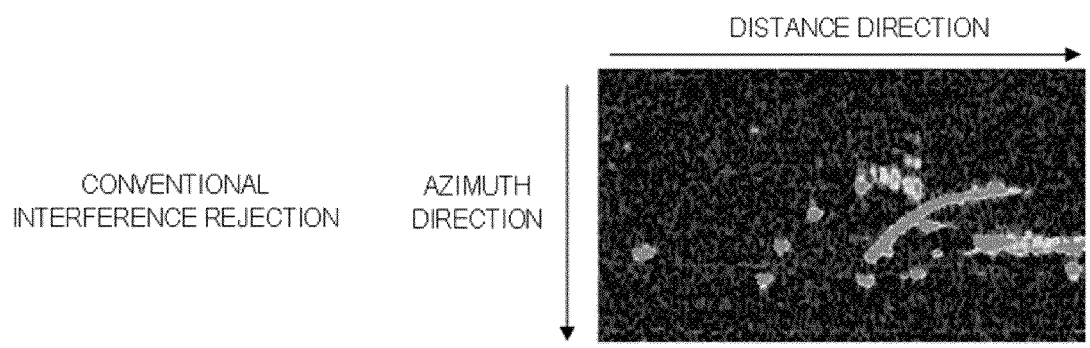
Figure 5C:
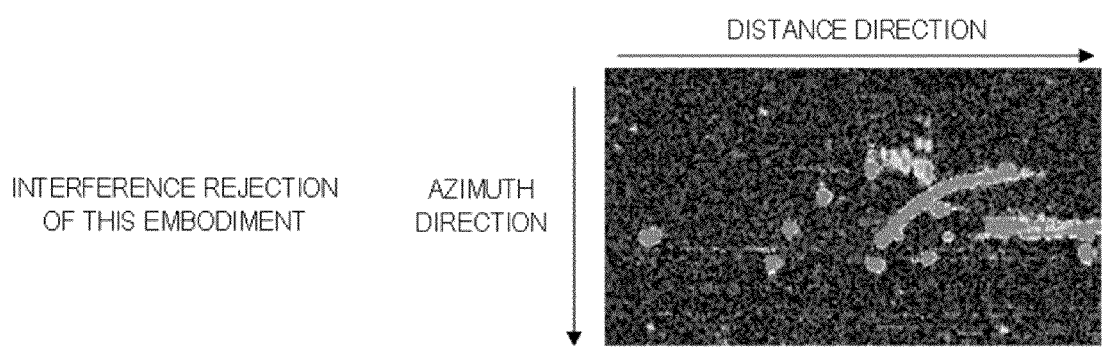

The display 18 reads the rectangular coordinate data stored in the rectangular coordinate memory 17, and displays a radar image (echo image) as shown in FIGS. 5A to 5C. Note that, in this embodiment, an example where a background color is black and pixels with higher pixel intensity values are displayed brighter in gray level. Conversely, the background color may be white and the pixels with higher pixel intensity values may be displayed darker in the gray level. Alternatively, they may be displayed as a color image.

The echo signal received by the antenna 11 may contain electromagnetic wave(s) emitted from the other ship(s) as an interference component, except for the electromagnetic wave(s) reflected on the target object(s). If the interference component is contained in the echo signal, an echo image elongated in a distance direction will be displayed as shown in FIG. 5A.

Therefore, the interference processing module 15 of the radar apparatus of this embodiment detects the interference component, performs level reduction processing, and updates the contents of the sweep data in the sweep memory 14. As a result, the sweep data after the interference reduction processing is inputted to the image converting module 16, and the echo image from which only the interference component is accurately removed is displayed on the display 18.

Figure 1B:
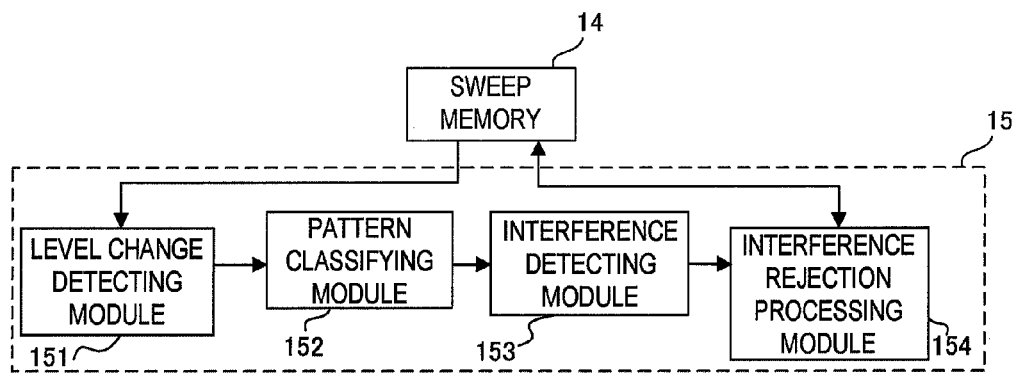
FIG. 1B is a block diagram showing a configuration of an interference processing module shown in FIG. 1A.

Hereinafter, contents of the processing of the interference processing module 15 are explained in detail. FIG. 1B is a block diagram showing a configuration of the interference processing module 15. The interference processing module 15 includes a level change detecting module 151, a pattern classifying module (pattern output module) 152, an interference detecting module 153, and an interference rejection processing module 154. The interference processing module 15 detects the interference component contained in the sweep data, and performs the level reduction processing by using these components.

The level change detecting module 151 reads out the sweep data from the sweep memory 14, and detects a level change between data of sweeps at the same distance, for respective distances. When a sample of a certain sweep is x(n) and a sample of the next sweep at the same distance from the ship is x(n+1), the level change detecting module 151 obtains a level difference x(n+1)−x(n) between the samples of the sweeps for all the samples.

The pattern classifying module 152 classifies the level change between the samples of the sweeps obtained by the level change detecting module 151 into one of a plurality of patterns. FIGS. 2A to 2D are views showing the patterns of the level change between the samples of the sweeps. As shown in FIGS. 2A to 2D, the pattern classifying module 152 classifies the level change between the samples of the sweeps into one of three patterns determined by following Expression (1).

$$\begin{cases} \text{if} & x(n+1) - x(n) < thresholdN \text{ then } PaternN \\ \text{else if} & x(n+1) - x(n) > thresholdP \text{ then } PaternP \\ \text{else} & PaternZ \end{cases} \quad (1)$$

Figure 2A:
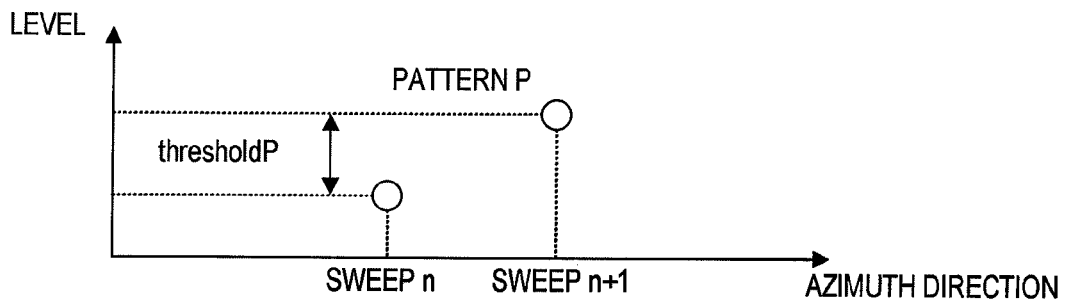
FIGS. 2A to 2D are views showing patterns of a level change between samples of sweeps.

That is, as shown in FIG. 2A, the pattern classifying module 152 determines as a pattern P (positive change) when the level of the sample x(n+1) of the next sweep is higher than the level of the sample x(n) of the certain sweep by a predetermined value or greater (when the level difference is greater than a predetermined threshold thresholdP). Note that, "thresholdP" in other figures indicates that the level difference between the samples of the sweeps is the value of thresholdP or greater.

Figure 2B:
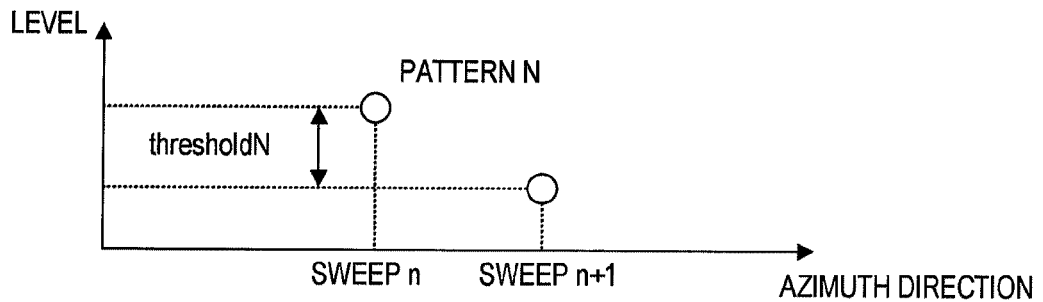
Figure 2C:
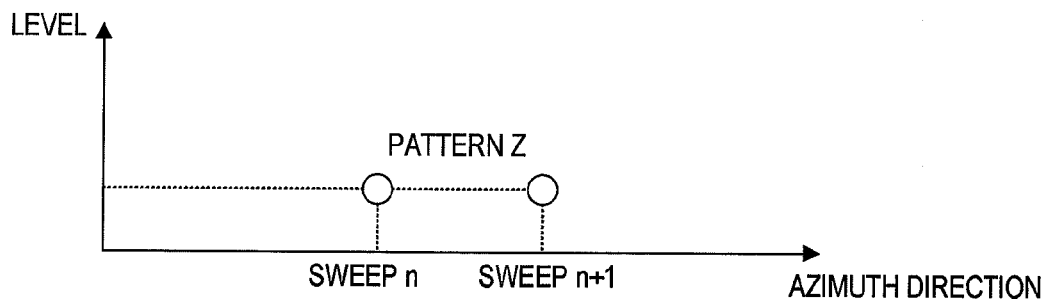
Figure 2D:
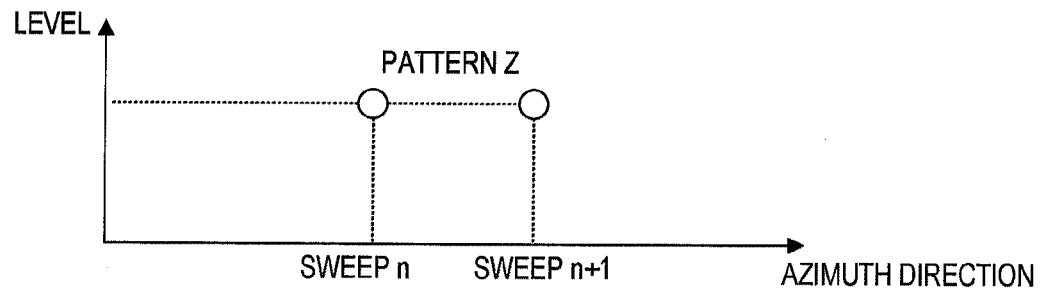

Further, as shown in FIG. 2B, the pattern classifying module 152 determines as a pattern N (negative change) when the level of the sweep data x(n+1) is lower than the level of the sweep data x(n) by a predetermined value or greater (when the level difference is smaller than a predetermined threshold thresholdN). Note that, thresholdP>thresholdN and "thresholdN" in other figures indicates that the level difference between the data of the sweeps is the value of thresholdN or lower. As shown in FIGS. 2C and 2D, when the level change is not applicable to the pattern N nor pattern P (i.e., when the level change between the data of the sweeps is small), it is considered as a pattern Z.

Figure 3A:
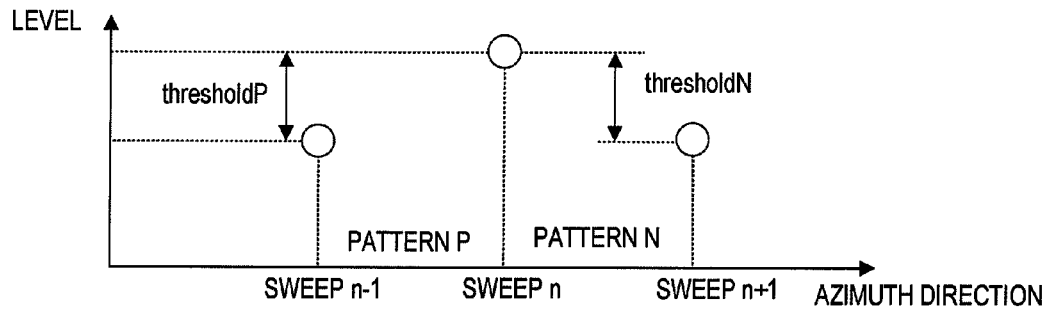
FIGS. 3A to 3C are views showing patterns for determining as interference.
Figure 3B:
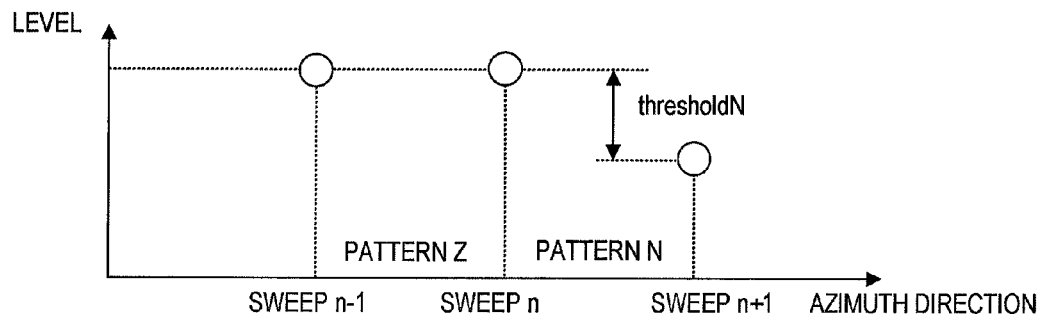
Figure 3C:
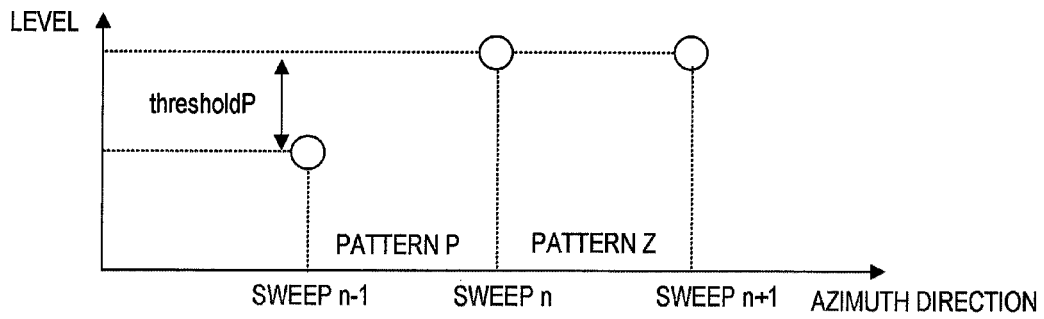

The interference detecting module 153 determines for each sample of the sweep data whether it is the echo signal originated from the interference, based on the patterns classified by the pattern classifying module 152. FIGS. 3A to 3C are views showing the patterns for determining as the interference. The interference detecting module 153 determines the interference for the observing sweep data x(n) based on the level change patterns of a plurality of samples (here, three samples which contain the adjacent samples) which continue in the azimuth direction. For example, as shown in FIG. 3A, when the level change pattern from the data x(n−1) to the data x(n) is the pattern P and the level change pattern from the data x(n) to the data x(n+1) is the pattern N, the interference detecting module 153 determines that the observing sweep data x(n) is the echo signal originated from the interference. An interference component has a characteristic in which its level dramatically falls after dramatically arising in the azimuth direction. Therefore, the interference detecting module 153 can accurately extract only the interference component by extracting the level change pattern peculiar to the interference component.

Alternatively, because the interference components may continue in the azimuth direction, they may be determined as the interference when, as shown in FIG. 3B, the change pattern from the data x(n−1) to the data x(n) is the pattern Z and the change pattern from the data (x) to the data x(n+1) is the pattern N, or when, as shown in FIG. 3C, the change pattern from the data x(n−1) to the data x(n) is the pattern P and the change pattern from the data x(n) to the data x(n+1) is the pattern Z.

Figure 4A:
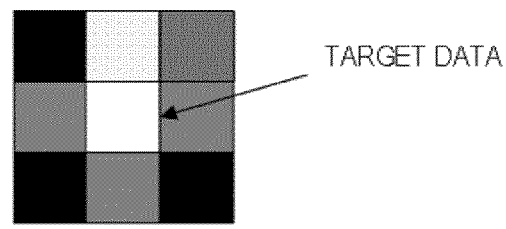
FIGS. 4A to 4E are views showing kinds of level reduction processing.
Figure 4B:
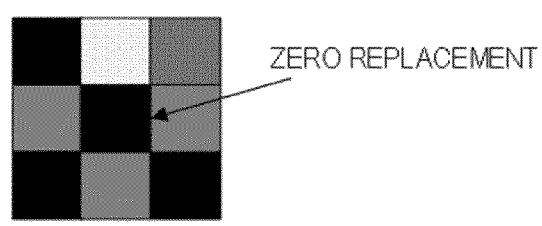

The interference rejection processing module 154 performs level reduction processing of the sweep data determined as interference by the interference detecting module 153. FIG. 4A is a view showing each of the samples before the level reduction processing as an echo image. Alternatively, as the level reduction processing, the target data determined as the interference may be replaced by zero as shown in FIG. 4B, or the following processing may be performed.

Figure 4C:
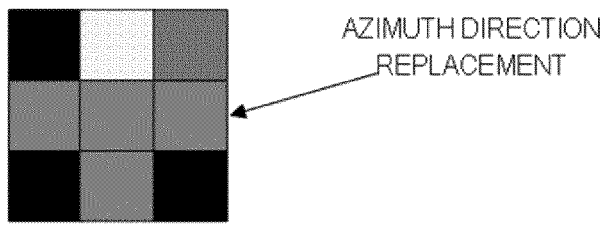
Figure 4D:
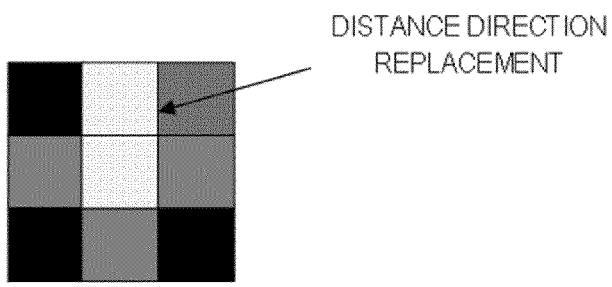
Figure 4E:
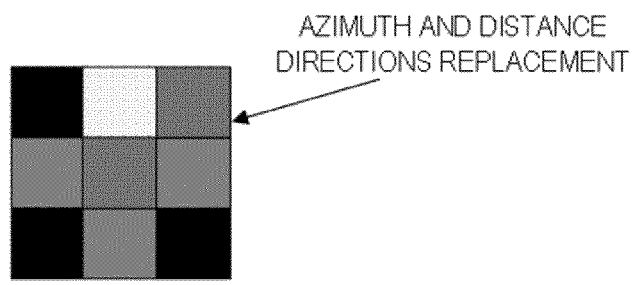

For example, as shown in FIG. 4C, the interference rejection processing module 154 replaces the target data by one of the adjacent data in the azimuth direction. In this case, it may be replaced by an average value of the adjacent data in the azimuth direction. Alternatively, as shown in FIG. 4D, the interference rejection processing module 154 may replace the target data by data next to the target data in the distance direction. In this case, it may also be replaced by an average value of the adjacent data in the distance direction. Further, as shown in FIG. 4E, the interference rejection processing module 154 may replace the target data by one of the adjacent data in both the azimuth and the distance directions. In this case, it may also be replaced by an average value of a plurality of data (e.g., the four data). Moreover, the interference rejection processing module 154 may estimate the level of the interference component and reduces by the level of the interference component.

By the above described processing, the interference rejection processing 154 removes the interference component and updates the sweep data. As shown in FIG. 5A, if the interference component is contained in the echo signal, a high level echo image elongated in the distance direction is displayed and an indication quality is degraded.

Figure 6A:
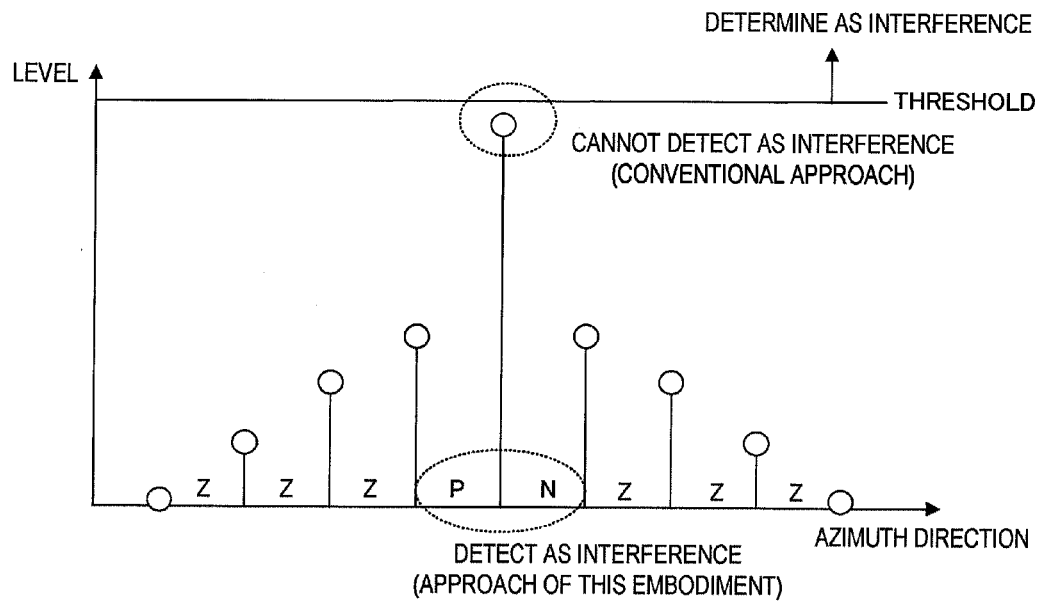
FIGS. 6A and 6B are views showing differences between conventional interference detections and interference detections of this embodiment.
Figure 6B:
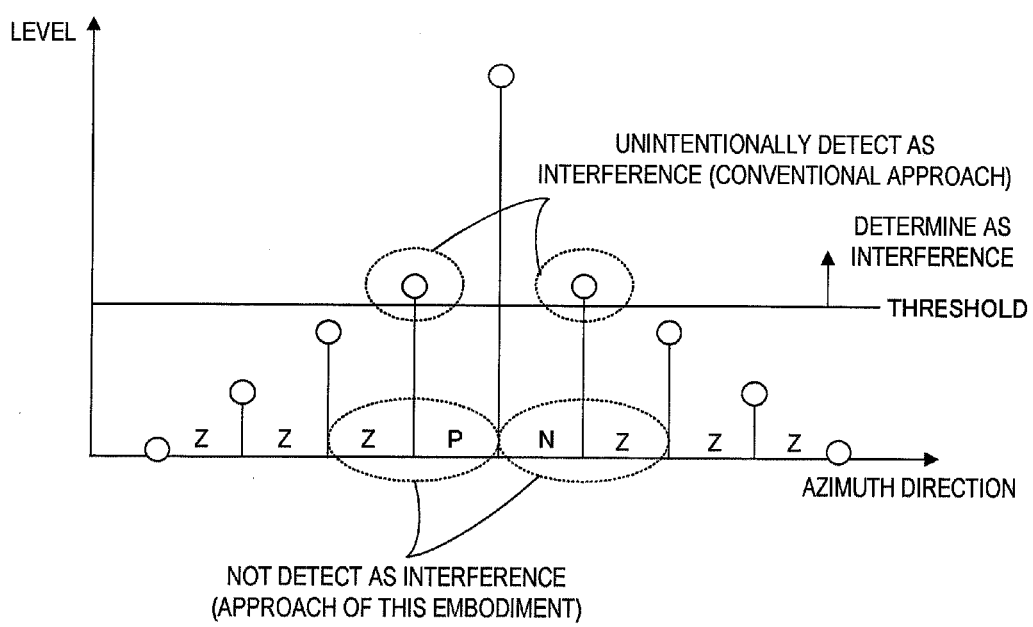
Figure 7:
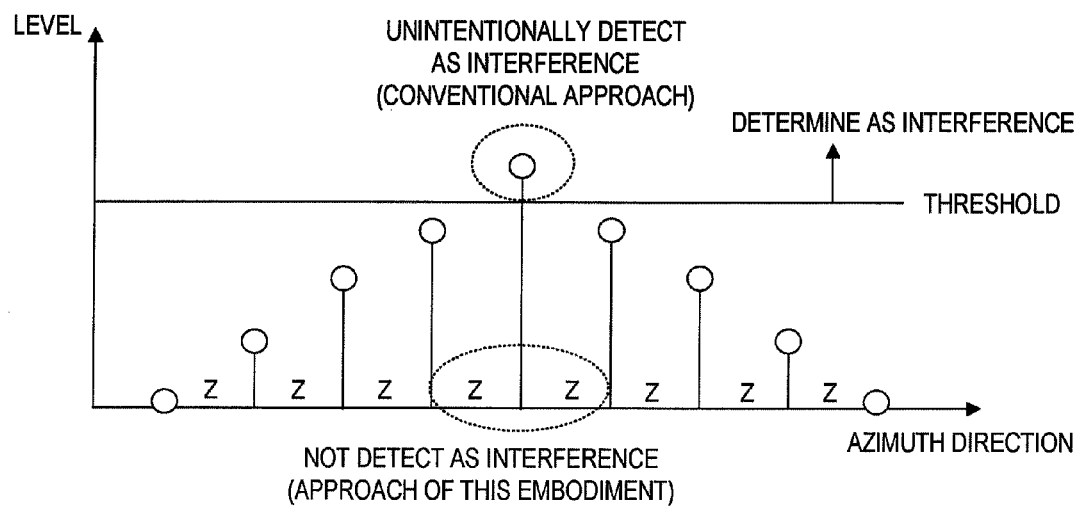
FIG. 7 is a view showing a difference between a conventional interference detection and an interference detection of this embodiment.

With the conventional interference detection processing, there is a case where, for example, the interference is determined whether sweep data of a certain position exceeds a threshold, thereby, as shown in FIG. 6A, the interference cannot be detected by setting a higher threshold, and, conversely, as shown in FIG. 6B, a portion other than the interference is determined as the interference if setting a lower threshold. Further, as shown in FIG. 7, there also is case where the echo signal from the target object is detected as the interference.

Moreover, also in a case where sweep data of the minimum value among a plurality of data of the same distance is replaced by the observing sweep data, there is a possibility that a portion other than the interference is removed. Therefore, also in the conventional processing where the sweep data of the minimum value is replaced by the observing sweep data, as shown in FIG. 5B, the area of the echo image of the target object greatly decreases.

On the other hand, the radar apparatus of this embodiment detects the portion in which its level dramatically falls after dramatically arising in the azimuth direction as interference and then performs the reduction processing. Therefore, as shown in FIGS. 6A and 6B, only the interference portion can accurately be extracted. Further, as shown in FIG. 7, there is less possibility of detecting the echo signal from the target object as the interference. Therefore, as shown in FIG. 5C, only the portion of the high level echo image elongated in the distance direction can accurately be removed.

Note that, the number of sweep data used for the interference determination is not limited to three, but may also be four or more. For example, as shown in FIGS. 8A to 8E and 9A to 9D, the interference determination may be performed using five sweep data continuing in the azimuth direction. First, the level change patterns for determining as interference by using the five sweep data are described with reference to FIGS. 8A to 8E.

Figure 8A:
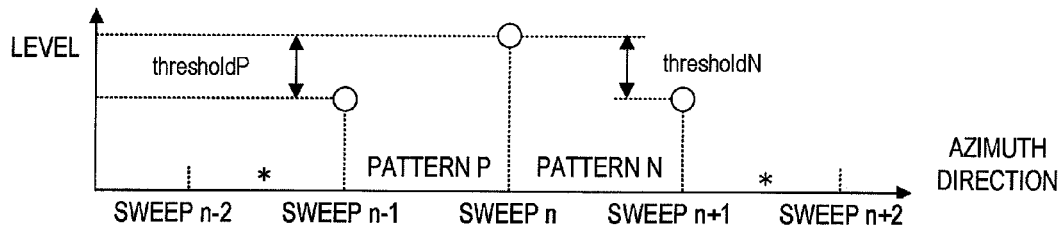
FIGS. 8A to 8E are views showing change patterns when performing an interference determination using five sweep data which continue in the azimuth direction.
Figure 8B:
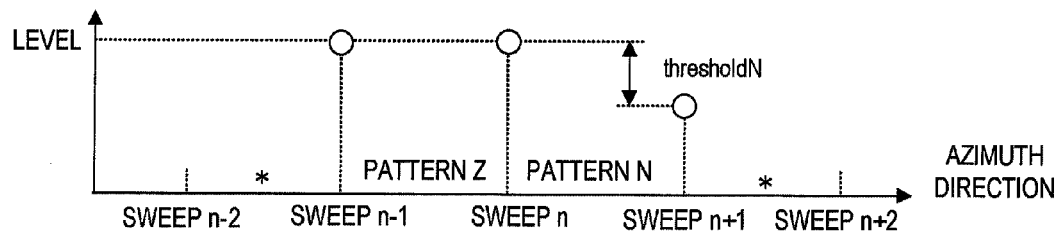
Figure 8C:
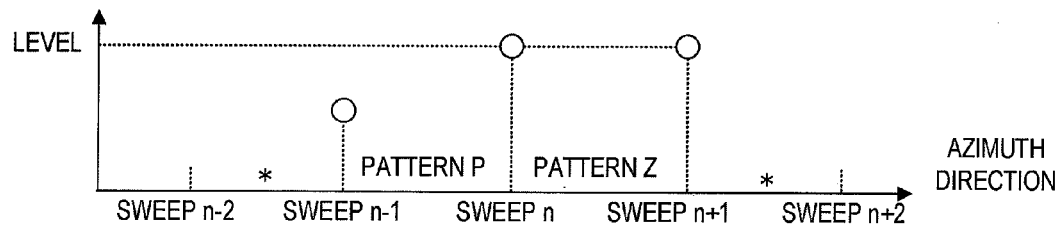

As shown in FIG. 8A, when the level change from the data of the sweep of one sweep before to the data of the observing sweep is the pattern P and the level change from the data of the observing sweep to the data of the next sweep is the pattern N, regardless of the level changes of other portions (from data of a sweep n−2 to data of a sweep n−1 and from data of a sweep n+1 to data of a sweep n+2), the interference detecting module 153 determines as the interference in an approach similar to that using the three sweep data. Similarly, as shown in FIG. 8B, when the level change from the data of the sweep of one sweep before to the data of the observing sweep is the pattern Z and the level change from the data of the observing sweep to the data of the next sweep is the pattern N, regardless of the level changes of other portions, the interference detecting module 153 determines as the interference in an approach similar to that using the three sweep data. Further, as shown in FIG. 8C, when the level change from the data of the sweep of one sweep before to the data of the observing sweep is the pattern P and the level change from the data of the observing sweep to the data of the next sweep is the pattern Z, regardless of the level changes of other portions, the interference detecting module 153 determines as the interference in an approach similar to that using the three sweep data.

Figure 8D:
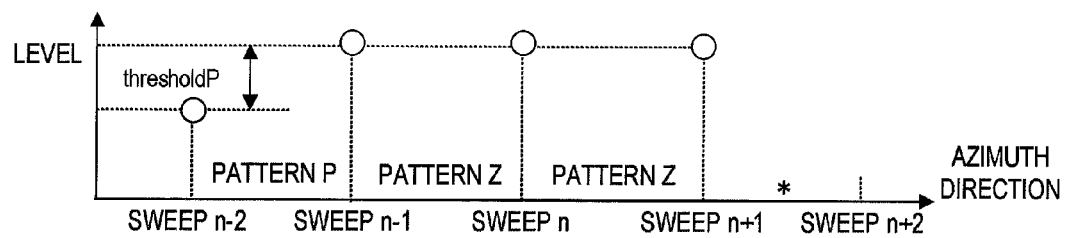
Figure 8E:
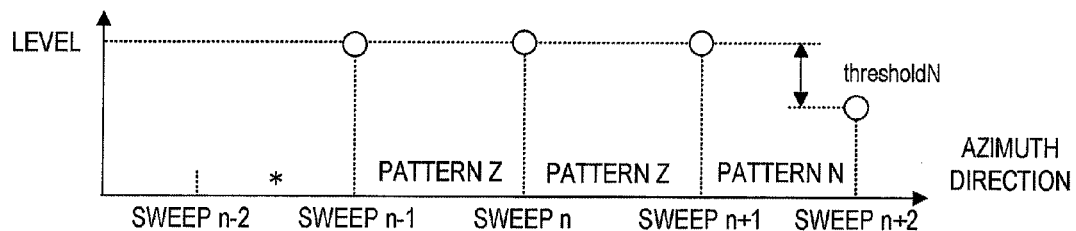

Further, as shown in FIG. 8D, the interference detecting module 153 also determines as the interference when the change pattern from the data of the sweep of one sweep before to the data of the observing sweep and from the data of the observing sweep to the data of the next sweep are both pattern Z and the change pattern from sweep data x(n−2) to the sweep data x(n−1) is the pattern P. Similarly, as shown in FIG. 8E, the interference detecting module 153 also determines as the interference when the change patterns from the data of the sweep of one sweep before to the data of the observing sweep and from the data of the observing sweep to the data of the next sweep are both pattern Z and the change pattern from the sweep data x(n+1) to sweep data x(n+2) is the pattern N. Thereby, the interference component in which the comparable levels continue in the azimuth direction can also be detected.

Figure 9A:
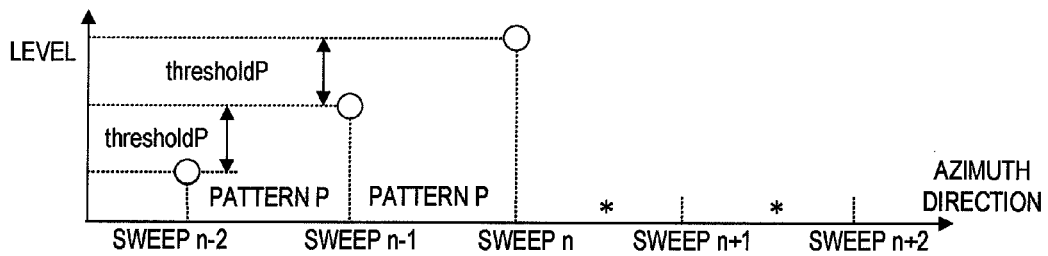
FIGS. 9A to 9D are views showing change patterns when performing an interference determination using five sweep data which continue in the azimuth direction.
Figure 9B:
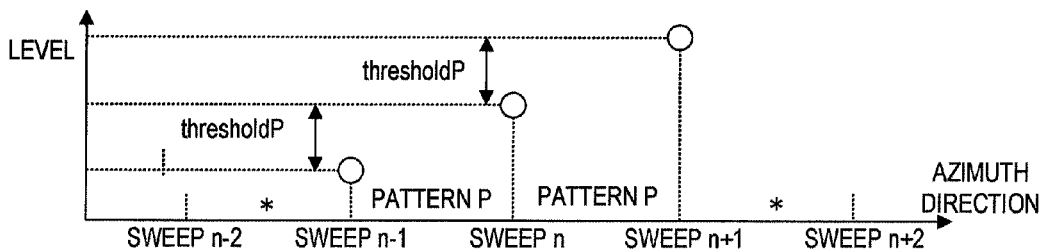
Figure 9C:
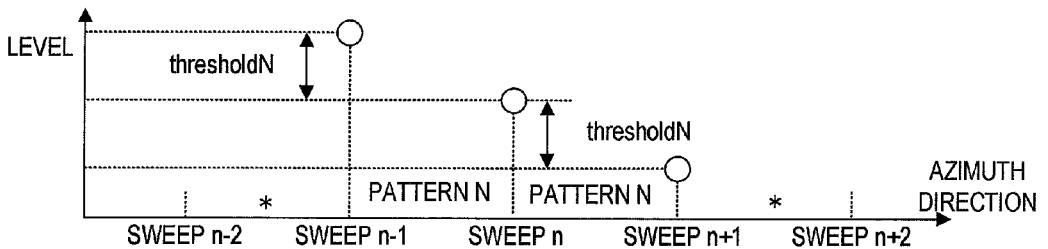
Figure 9D:
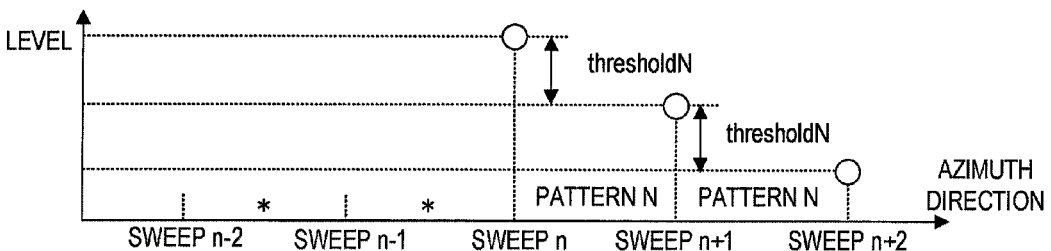

Furthermore, the interference detecting module 153 may determine as the interference when the change pattern continues to be the pattern P or the pattern N in the azimuth direction in an approach as follows. That is, the interference detecting module 153 determines as the interference when, as shown in FIG. 9A, the change pattern from the sweep data x(n−2) to the sweep data x(n−1) is the pattern P and the change pattern from the sweep data x(n−1) to the sweep data x(n) is the pattern P, or when, as shown in FIG. 9B, the change pattern from the sweep data x(n−1) to the sweep data x(n) is the pattern P and the change pattern from the sweep data x(n) to the sweep data x(n+1) is the pattern P. Further, the interference detecting module 153 determines as the interference when, as shown in FIG. 9C, the change pattern from the sweep data x(n−1) to the sweep data x(n) is the pattern N and the change pattern from the sweep data x(n) to the sweep data x(n+1) is the pattern N, or when, as shown in FIG. 9D, the change pattern from the sweep data x(n) to the sweep data x(n+1) is the pattern N and the change pattern from the sweep data x(n+1) to the sweep data x(n+2) is the pattern N. In these cases, the interference component which has the signal levels different in the azimuth direction can be detected.

Figure 10A:
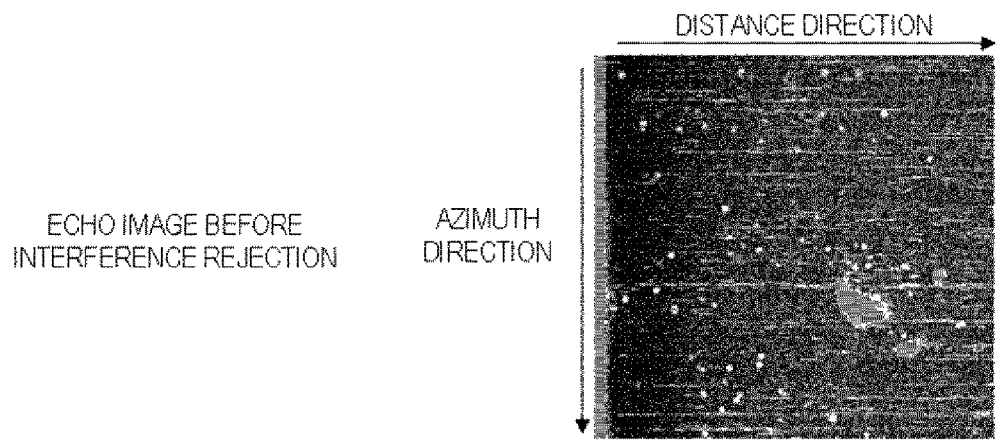
FIGS. 10A to 10C are views showing echo images.
Figure 10B:
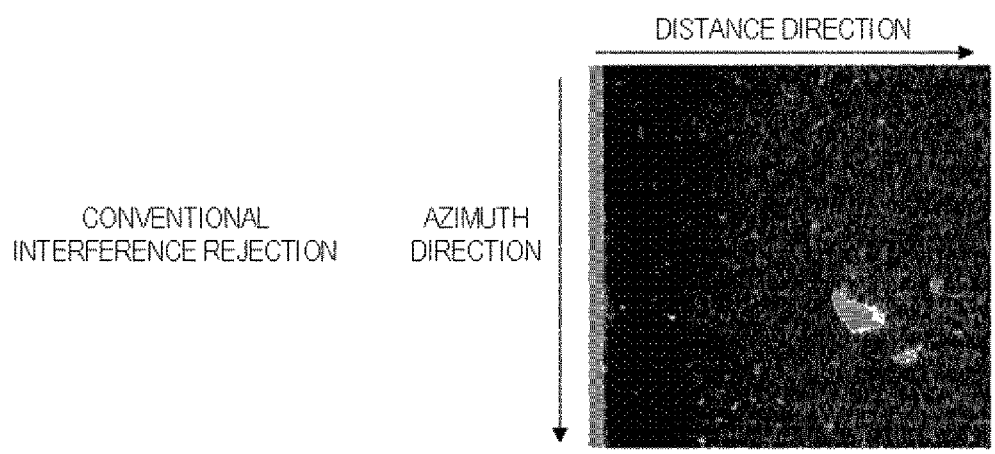

Effects of the interference rejection in the above-described approach is explained with reference to FIGS. 10A to 10C. FIG. 10A is an echo image before the interference rejection. Meanwhile, as shown in FIG. 10B, with the conventional interference detection processing (when the minimum value among a plurality of sweeps is adopted), the echo images of small target objects are removed to the extent where they can hardly be recognized.

Figure 10C:
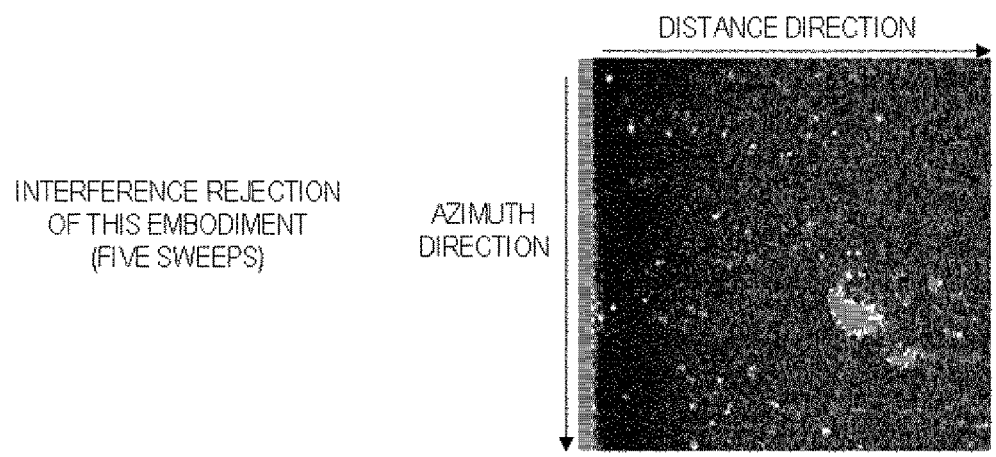

On the other hand, as shown in FIG. 10C, with the approach which determines whether it is the interference based on the level changes between five sweeps in the azimuth direction, only an interference portion is accurately removed, and, thereby, the echo image of the small target object can be recognized.

Note that, the determination based on the three sweep data and the determination based on the five sweep data may be switched according to an occurrence frequency of the interference. For example, a determination is normally performed using the five sweep data, and, when a plurality of samples in the azimuth direction are continuously determined to be the interference, it is switched to the determination based on the three sweep data.

Here, as described above, although only the level changes in the azimuth direction is taken into consideration, the determination may be performed taking the levels in a distance direction into consideration. In this case, a change pattern is calculated, for example, using a sample averaged in the distance direction, as following Expression (2).

$$\begin{cases} \text{if} \quad \frac{1}{W}\sum_{r}^{W}\{x(n+1)-x(n)\} < thresholdN \text{ then } PaternN \\ \text{else if} \quad \frac{1}{W}\sum_{r}^{W}\{x(n+1)-x(n)\} > thresholdP \text{ then } PaternP \\ \text{else} \quad\quad\quad\quad\quad\quad\quad\quad\quad\quad\quad\quad PaternZ \end{cases} \quad (2)$$

In many cases, the interference component is a high level signal over a plurality samples in the distance direction, in addition to the characteristic in which the level dramatically falls after dramatically arising in the azimuth direction. Therefore, the level change detecting module 151 averages the respective level changes between the samples by using the signal in the distance direction, and the pattern classifying module 152 classifies the averaged level change into one of a plurality of patterns. As Expression (2), by calculating the change patterns using the sample obtained by averaging a plurality of samples in the distance direction, it can be prevented that the small target object shorter in the distance direction is false detected as interference.

Figure 11B:
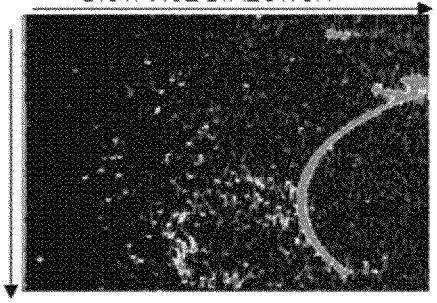

Effects of the interference rejection when taking the distance direction into consideration is explained with reference to FIGS. 11A to 11D. FIG. 11A is an echo image before the interference rejection. As shown in FIG. 11B, with the conventional interference detection processing, the echo images of small target objects are removed to the extent where it can hardly be recognized.

Figure 11C:
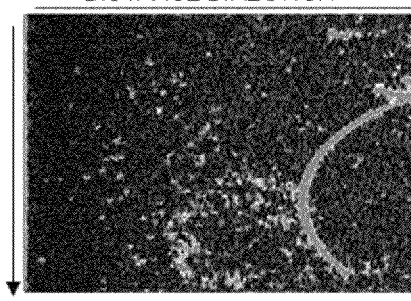
Figure 11D:
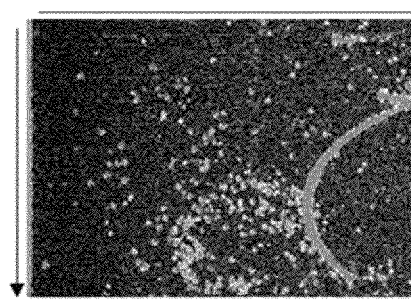

On the other hand, when level change is calculated in the distance direction using only one sample and the interference is detected by the pattern classification, as shown in FIG. 11C, only the interference portions are accurately removed compared with the conventional approach, and the echo image of the small target object can be recognized. Here, by further calculating a level change obtained by averaging a plurality of samples (e.g., four samples) in the distance direction and detecting interference by the pattern classification, the echo image of a smaller target object can be recognized.

Figure 12A:
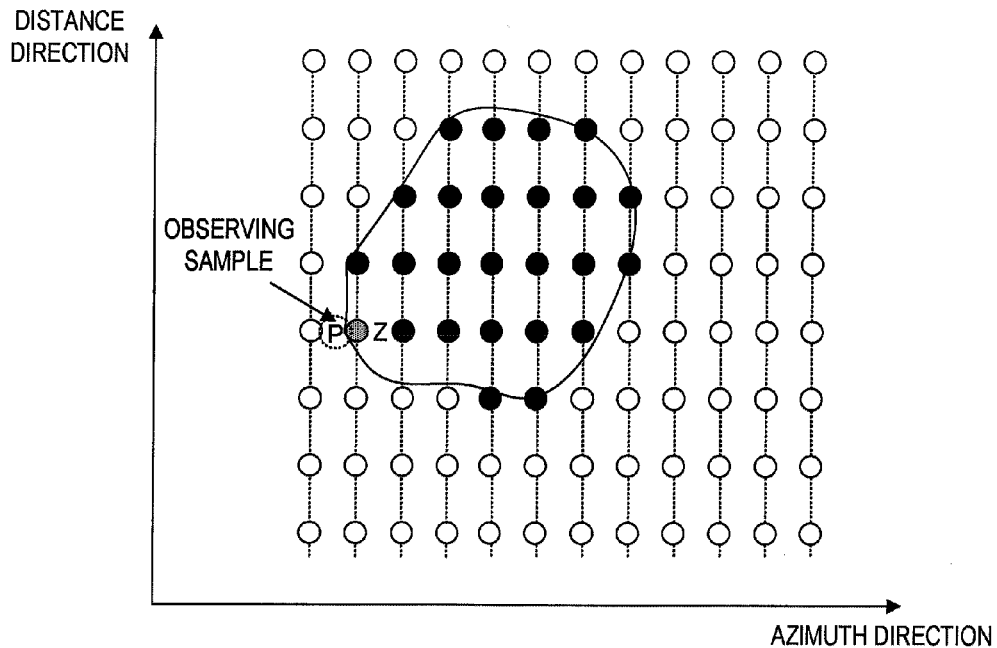
FIGS. 12A and 12B are views showing classifications of change patterns by taking samples in a distance direction into consideration.
Figure 12B:
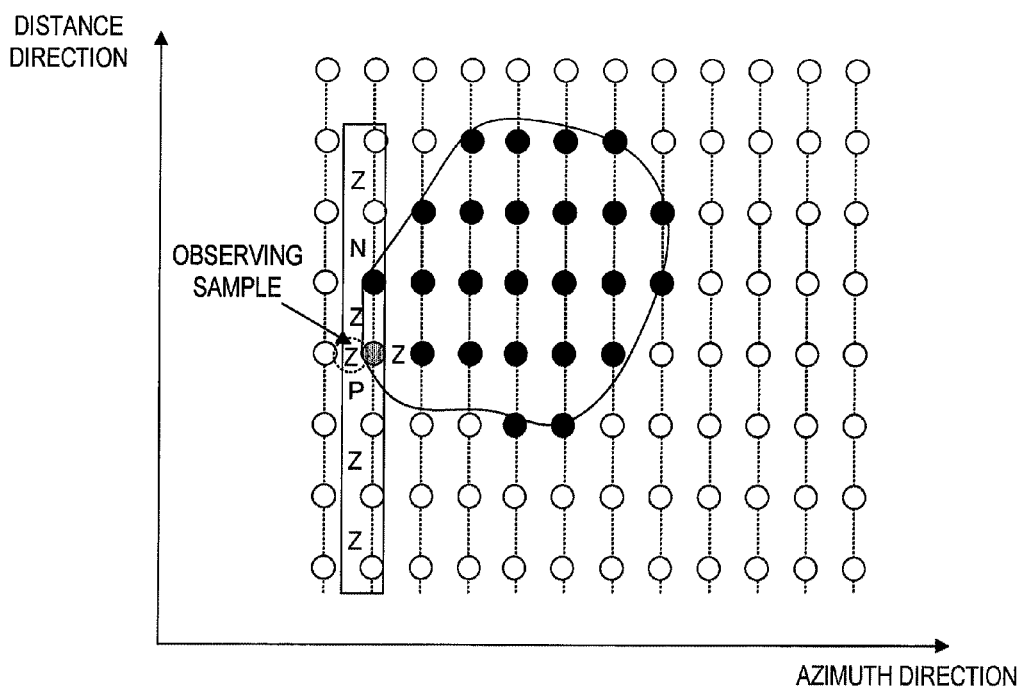

Further, the determination may be performed taking a level change in a distance direction into consideration, as shown in FIGS. 12A and 12B. Here, as shown in FIG. 12A, the level change detecting module 151 detects a level change between samples adjacent to each other in the azimuth direction. The pattern classifying module 152 classifies the level changes in the azimuth direction into a plurality of patterns (patterns P, N and Z). Further, as shown in FIG. 12B, the level change detecting module 151 also detects level changes between samples adjacent in the distance direction, for each of the samples in the azimuth direction. Further, the pattern classifying module 152 classifies the level changes in the distance direction into a plurality of patterns (patterns P, N and Z).

Moreover, with reference to a plurality of change patterns (e.g., six adjacent patterns) in the distance direction for each sample, the pattern classifying module 152 classifies the most frequent change pattern as the change pattern for the azimuth direction. For example, as shown in FIG. 12A, for a certain observing sample, even if a change pattern from a sample of a sweep of one sweep before to the observing sample is the pattern P, as shown in FIG. 12B, the pattern classifying module 152 replaces the pattern P by the pattern Z which is the most frequent change pattern among the six adjacent patterns in the distance direction. As a result, the observing sample which is to be determined as the interference (pattern P to pattern Z) by only the determination of the azimuth direction can be determined that it is not interference.

Furthermore, a determination of level changes in the distance direction may be performed in addition to the determination of the level changes in the azimuth direction. For example, a sample which the change patterns in the azimuth direction change from the pattern P to the pattern N, the pattern P to the pattern Z, or the pattern Z to the pattern N, and the change patterns in the distance direction are the pattern Z is determined as interference.

Alternatively, without limiting the number of the observing sample to only one, a plurality of samples in the azimuth and distance directions may be used as observing samples and the determination of interference may be made based on a two-dimensional change pattern. In this case, it is determined whether it is the interference by storing the two-dimensional change pattern (reference) which is determined to be interference in a memory (not illustrated) in advance and comparing the observing samples with the reference. Here, the fuzzy reasoning or the neural network may be used for the pattern matching techniques.

Further, in this embodiment, the thresholds (thresholdP and thresholdN) of the level changes are fixed values. However, they may adaptively be changed. For example, when a gain of an echo signal is changed between sweeps, the threshold may be changed corresponding to the difference of gain between the sweeps (i.e., the threshold corresponds to a gain ratio).

Further, as described above, the level changes of the sweep data adjacent to each other in the azimuth direction and/or the distance direction are detected. However, respective level changes between two sweep data close to each other may be detected by ignoring (thinning out) data of, for example, every other sweep.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the tendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A signal processing device, comprising:
   an echo signal input module for being inputted with echo signals caused by electromagnetic waves emitted from an antenna being reflected on one or more target objects;
   an echo signal level detecting module for detecting a level of each of the echo signals in association with a distance and an azimuth direction from the antenna;
   a level change detecting module for detecting a level change between the echo signals from locations which are close to each other where the distances from the antenna are substantially the same but the azimuth directions from the antenna are different;
   a pattern output module for comparing the level change with a reference pattern determined in advance to output a level change pattern; and
   an interference determining module for determining interference based on at least two of the level change patterns.

2. The signal processing device of claim 1, wherein the locations corresponding to the echo signals used for outputting the at least two level change patterns are adjacent to each other.

3. The signal processing device of claim 2, wherein the pattern output module classifies the pattern into one of a first pattern in which the level change exceeds a first threshold, a second pattern in which the level change is less than a second threshold, and a third pattern in which the level change neither apply to the first pattern nor the second pattern.

4. The signal processing device of claim 3, wherein the interference determining module determines as the interference when the pattern of the level change changes from the first pattern to the second pattern.

5. The signal processing device of claim 3, wherein the interference determining module determines as the interference when the pattern of the level change changes from the first pattern to the third pattern.

6. The signal processing device of claim 3, wherein the interference determining module determines as the interference when the pattern of the level change changes from the third pattern to the second pattern.

7. The signal processing device of claim 1, wherein the level change corresponds to a difference value of the levels of the echo signals adjacent to each other in the azimuth direction.

8. The signal processing device of claim 3, wherein the interference determining module determines as the interference in either one of cases where the third pattern following after the first pattern exists and where at least two of the third patterns continuously exist.

9. The signal processing device of claim 3, wherein the interference determining module determines as the interference in either one of cases where at least two of the third patterns continuously exist and where the second pattern following after the third pattern exists.

10. The signal processing device of claim 3, wherein the interference determining module determines as the interference in a case where at least two of the first patterns continuously exist.

11. The signal processing device of claim 3, wherein the interference determining module determines as the interference in a case where at least two of the second patterns continuously exist.

12. The signal processing device of claim 1, wherein the level change detecting module averages the level changes in the distance direction; and
wherein the pattern output module compares the averaged level change with the level change pattern.

13. The signal processing device of claim 1, wherein the level change detecting module further detects a level change between the echo signals from locations which are close to each other where the azimuth directions from the antenna are substantially the same but the distances from the antenna are different; and
wherein the pattern output module outputs the most frequent level change pattern within a predetermined distance range as the change pattern for the azimuth and distance directions.

14. The signal processing device of claim 1, wherein the level change detecting module further detects a level change between the echo signals from locations which are close to each other where the azimuth directions from the antenna are substantially the same but the distances from the antenna are different; and
wherein the interference determining module determines the interference further based on a plurality of level change patterns close to each other in the distance direction.

15. The signal processing device of claim 1, further comprising an echo signal level controlling module for controlling the level of the echo signal caused by the interference.

16. The signal processing device of claim 15, wherein the echo signal level controlling module replaces the level of the echo signal caused by the interference by any one of the levels of the echo signals or by an average value of a plurality of levels of the echo signals adjacent to each other in the azimuth direction.

17. The signal processing device of claim 15, wherein the echo signal level controlling means linearly interpolates the level of the echo signal caused by the interference according to a plurality of levels of the echo signals adjacent to each other in the azimuth direction.

18. A radar apparatus, comprising:
an echo signal input module for being inputted with echo signals caused by electromagnetic waves emitted from an antenna being reflected on one or more target objects;
an echo signal level detecting module for detecting a level of each of the echo signals in association with a distance and an azimuth direction from the antenna;
a level change detecting module for detecting a level change between the echo signals from locations which are close to each other where the distances from the antenna are substantially the same but the azimuth directions from the antenna are different;
a pattern output module for comparing the level change with a reference pattern determined in advance to output a level change pattern;
an interference determining module for determining interference based on at least two of the level change patterns; and
an antenna for revolving while emitting electromagnetic waves for every azimuth direction and receiving echo signals.

19. A method of processing a signal, comprising:
inputting echo signals caused by electromagnetic waves emitted from an antenna being reflected on one or more target objects;
detecting a level of each of the echo signals in association with a distance and an azimuth direction from the antenna;
detecting a level change between the echo signals from locations which are close to each other where the distances from the antenna are substantially the same but the azimuth directions from the antenna are different;
comparing the level change with a reference pattern determined in advance to output a level change pattern; and
determining interference based on at least two of the level change patterns.

20. A computer readable program for causing a computer to process a signal, comprising:
causing a computer to be inputted with echo signals caused by electromagnetic waves emitted from an antenna being reflected on one or more target objects;
causing a computer to detect a level of each of the echo signals in association with a distance and an azimuth direction from the antenna;
causing a computer to detect a level change between the echo signals from locations which are close to each other where the distances from the antenna are substantially the same but the azimuth directions from the antenna are different;
causing a computer to compare the level change with a reference pattern determined in advance to output a level change pattern; and
causing a computer to determine interference based on at least two of the level change patterns.

* * * * *